United States Patent [19]

Kamata

[11] Patent Number: 4,693,457
[45] Date of Patent: Sep. 15, 1987

[54] VIBRATION DAMPER

[75] Inventor: Yoshikiyo Kamata, Hachioji, Japan

[73] Assignee: Kioritz Corporation, Tokyo, Japan

[21] Appl. No.: 904,862

[22] Filed: Sep. 8, 1986

Related U.S. Application Data

[63] Continuation of Ser. No. 711,051, Mar. 12, 1985, abandoned.

[30] Foreign Application Priority Data

Mar. 21, 1984 [JP] Japan ............... 59-40329[U]

[51] Int. Cl.$^4$ ............................................. F16F 1/54
[52] U.S. Cl. ..................................... 267/153; 248/635; 267/141; 267/292; 280/716
[58] Field of Search ............... 267/63 R, 63 A, 153, 267/140.1, 141; 280/716, 717; 180/300, 902; 403/220; 248/609, 634, 635; 464/87, 89, 92, 96

[56] References Cited

U.S. PATENT DOCUMENTS

| | | | |
|---|---|---|---|
| 2,147,660 | 2/1939 | Loewus | 248/635 |
| 2,549,692 | 4/1951 | Lentz | 267/141 |
| 4,032,125 | 6/1977 | Minakawa et al. | 267/63 A |
| 4,522,378 | 6/1985 | Nelson | 267/63 A X |
| 4,533,126 | 8/1985 | Mueller et al. | 267/141 |

FOREIGN PATENT DOCUMENTS

| | | | |
|---|---|---|---|
| 458167 | 7/1949 | Canada | 464/89 |
| 831953 | 2/1952 | Fed. Rep. of Germany | 267/153 |
| 1002168 | 2/1957 | Fed. Rep. of Germany | 267/141 |
| 1049411 | 12/1953 | France | 464/89 |

Primary Examiner—George E. A. Halvosa
Attorney, Agent, or Firm—Browdy and Neimark

[57] ABSTRACT

A vibration damper includes a hollow cylindrical member which is formed of an elastic material and to one end of which a fixture is secured a plug-like member which is formed of an elastic material, which has a flanged head portion with another fixture secured thereto, a neck portion to be inserted into the cylindrical member and which is disposed away from the cylindrical member in the axial direction such as to form spaces and an elastic connecting member for integrally connecting the cylindrical member and the plug-like member.

4 Claims, 4 Drawing Figures

VIBRATION DAMPER

This application is a continuation, of application Ser. No. 711,051, filed 3/12/85, now abandoned.

BACKGROUND OF THE INVENTION

This invention relates to a vibration damper used for a portable power tool such as a chain saw or grass trimmer.

Conventionally for this kind of tool a rubber vibration damper of a cylindrical or hourglass shape has been used in order to minimize the vibrations transferred to the worker from a power source such as an internal combustion engine or a working portion. However, this damper disadvantageously shows a low damping effect in the direction of axis of the attached damper due to compression or tension load.

SUMMARY OF THE INVENTION

Accordingly it is an object of the invention to eliminate the above-described drawback of the conventional vibration damper and to provide a vibration damper in which the damping effect is heightened by a structure for absorbing vibration by the damper threedimensionally deformed by shearing forces.

To this end a vibration damper according to this invention is composed of a cylindrical member which is made of an elastic material and to which a fixture is secured at one end, a plug-like member made of an elastic material and consisting of a head portion to which another fixture is secured and a neck portion for insertion into the cylindrical member. The plug-like member is disposed away from the cylindrical member in the axial direction such as to have a space therebetween and an elastic connecting member connects these two members into one body.

According to the invention, since the vibration transferred to one end of a vibration damper is absorbed by the neck portion, the connecting member or the cylindrical member in accordance with its direction, the relative one of which is deformed by shearing stress, the vibration damping effect is kept high in three dimentions and vibration can thus be effectively damped.

The above and other objects, features and advantages of the present invention will become clear from the following description of the preferred embodiments thereof, taken in conjunction with the accompanying drawings.

DESCRIPTION OF THE PREFERRED EMBODIMENT

Figure 1:
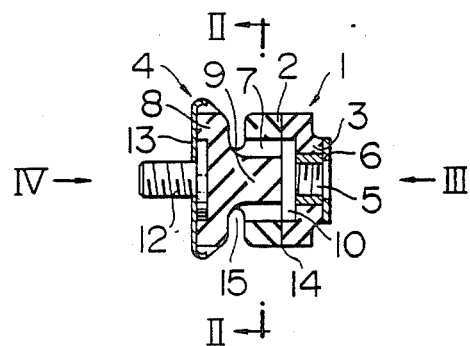
FIG. 1 is a vertical sectional view of an embodiment of a vibration damper according to the invention.

Referring now to FIG. 1, a vibration damper 1 has a hollow cylindrical member 2 with a bore therein and a plug-like member 4 which is secured to the cylindrical member in the way which will be described later. These members 2 and 4 are made of an elastic material such as rubber.

To the center of one end 3 of the cylindrical member 2 is secured a nut 5 as a fixture while being inserted into an elastic material, and to the other surface therof a reinforcing sheet 6 is attached by heat bonding such as to facilitate the attachment of the damper to a tool.

Figure 2:
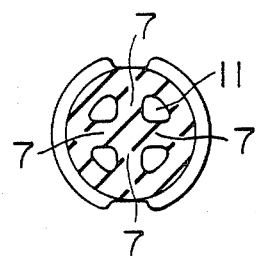
FIG. 2 is a sectional view taken along the line II—II of FIG. 1.
Figure 3:
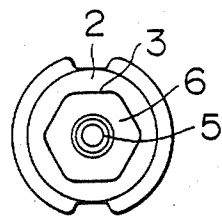
FIG. 3 is an end elevational view taken in the direction of arrow III.
Figure 4:
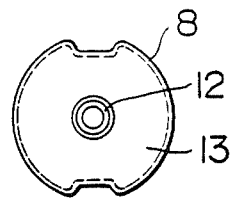
FIG. 4 is an end elevational view taken in the direction of arrow IV.

On the other hand, at the opening of the other end of the cylindrical member 2 is disposed a plug-like member 4 made of an elastic material and having a flanged head portion 8 and a neck portion 9 for insertion into the bore of cylindrical member 2 such as to form spaces 10, 11 and 15 in the axial direction. The axial length of the neck portion 9 is shorter than that of the hollow interior of the cylindrical member 2. The neck portion 9 is arranged such as to form a space 10 between the neck portion 9 and the inner surface of the end 3 of the cylindrical member 2 and are integrally connected to the cylindrical member 2 by an elastic connecting member 7 such as to form four hole-like spaces 11 in the interior of the cylindrical member 2, in the axial direction and at circumferentially approximately equal intervals, as shown in FIG. 2.

On the outer surface of the head portion 8 which has a space 15 between itself and the cylindrical member 2 is provided a bolt 12 as another fixture with its head portion securely embedded in the central portion of the surface and the threaded portion projecting outwardly in the axial direction. This bolt 12 is to be attached to a tool at a different portion from that of which the nut 5 is attached. Further, a reinforcing sheet 13 is attached by heat bonding to the outer end surface of the heat portion 8.

In manufacturing the vibration damper 1 according to the invention having the above-described structure, it is preferable to divide the damper 1 into two parts at a plane 14 including the inner end surface of the neck portion 9, form each of the half parts separately and bond them together by an appropriate method.

The vibration damper 1 is attached to a tool by securing, for example, the one end 3 of the cylindrical member 2 to the frame body of a tool through the nut 5 and the plug-like member 4 to the internal combustion engine of the tool through the bolt 12. The vibration transferred to the plug-like member 4 from the internal combustion engine is absorbed by the neck portion 9, the connecting member 7 or the cylindrical member 2, in accordance with its direction, the relative one of which is deformed by shearing forces, whereby the vibration damping effect can be maintained at a high level. The nut 5 and the bolt 12 can be replaced by appropriate fixtures by demands.

While there has been described what is at present considered to be a preferred embodiment of the invention, it will be understood that various modifications may be made therein, and it is intended that the appended claims cover all such modifications as fall within the true spirit and scope of the invention.

What is claimed is:

1. A vibration damper comprising:
   a hollow cylindrical member which is formed of an elastic material and to a bottom end of which an outwardly facing fixture is secured, said cylindrical member defining a bore with a radial bore wall therein, said fixture being essentially coaxial with said bore;
   a plug member which is formed of an elastic material which has an integral, radially extended flanged head portion with another outwardly facing fixture secured thereto, said flanged head portion having a diameter larger than the inside diameter of said cylindrical member and said plug member having an integral neck portion within said bore of said cylindrical member, space being defined between said neck portion and a bottom end of said bore of said cylindrical member, the flanged head portion being disposed away from said cylindrical member in the axial direction such as to form spaces therebetween; and an elastic connecting member for integrally connecting said cylindrical member and said plug member said elastic member defining a plurality of spaces between said plug member and said bore wall of said hollow cylindrical member.

2. The vibration damper of claim 1, said plurality of spaces between said plug member and said bore wall being circumferentially arranged about said plug member at essentially equal intervals.

3. The vibration damper of claim 2, including four of said spaces between said plug member and said bore wall.

4. The vibration damper of claim 3, wherein there are no more than four of said spaces between said plug member and said bore wall.